(12) United States Patent
Kim

(10) Patent No.: US 12,170,782 B2
(45) Date of Patent: *Dec. 17, 2024

(54) FAST INTRA-PREDICTION MODE SELECTION IN VIDEO CODING

(71) Applicant: Texas Instruments Incorporated, Dallas, TX (US)

(72) Inventor: Hyung Joon Kim, Johns Creek, GA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/896,174

(22) Filed: Aug. 26, 2022

(65) Prior Publication Data
US 2022/0417534 A1 Dec. 29, 2022

Related U.S. Application Data

(63) Continuation of application No. 17/088,346, filed on Nov. 3, 2020, now Pat. No. 11,463,710, which is a
(Continued)

(51) Int. Cl.
H04N 19/176 (2014.01)
H04N 19/107 (2014.01)
H04N 19/109 (2014.01)
H04N 19/119 (2014.01)
H04N 19/147 (2014.01)
H04N 19/96 (2014.01)

(52) U.S. Cl.
CPC ......... *H04N 19/176* (2014.11); *H04N 19/107* (2014.11); *H04N 19/109* (2014.11); *H04N 19/119* (2014.11); *H04N 19/147* (2014.11); *H04N 19/96* (2014.11)

(58) Field of Classification Search
CPC .. H04N 19/176; H04N 19/107; H04N 19/109; H04N 19/119; H04N 19/147; H04N 19/96
See application file for complete search history.

(56) References Cited

U.S. PATENT DOCUMENTS

2005/0069211 A1* 3/2005 Lee ............ H04N 19/149
375/E7.157
2005/0089094 A1* 4/2005 Yoo ............ H04N 19/593
375/E7.266
(Continued)

OTHER PUBLICATIONS

Liao, K-Y, J-F Yang, and M-T Sun, "Rate Distortion Cost Estimation for H.264/AVC", IEEE Transactions on Circuits and Systems for Video Technology, vol. 20, No. 1, Jan. 2010. (Year: 2010).*
(Continued)

*Primary Examiner* — Richard A Hansell, Jr.
(74) *Attorney, Agent, or Firm* — Carl G. Peterson; Frank D. Cimino

(57) ABSTRACT

A method for determining intra-prediction modes for prediction units (PUs) of a largest coding unit (LCU) is provided that includes determining an intra-prediction mode for each child PU of a PU, and selecting an intra-prediction mode for the PU based on the intra-prediction modes determined for the child PUs.

20 Claims, 6 Drawing Sheets

Related U.S. Application Data continuation of application No. 13/958,593, filed on Aug. 4, 2013, now Pat. No. 10,863,184.

(60) Provisional application No. 61/683,296, filed on Aug. 15, 2012.

(56) References Cited

U.S. PATENT DOCUMENTS

| | | | | |
|---|---|---|---|---|
| 2007/0041450 | A1* | 2/2007 | Kim | H04N 19/147 375/E7.176 |
| 2009/0245353 | A1* | 10/2009 | Choi | H04N 19/176 375/E7.243 |
| 2009/0245371 | A1* | 10/2009 | Choi | H04N 19/176 375/240.13 |
| 2011/0310976 | A1 | 6/2011 | Wang | |
| 2011/0243229 | A1* | 10/2011 | Kim | H04N 19/593 375/E7.243 |
| 2011/0274162 | A1* | 11/2011 | Zhou | H04N 19/184 375/240.03 |
| 2012/0082222 | A1* | 4/2012 | Wang | H04N 19/176 375/E7.243 |
| 2012/0106642 | A1* | 5/2012 | Letunovskiy | H04N 19/59 375/E7.125 |
| 2012/0177113 | A1* | 7/2012 | Guo | H04N 19/196 375/E7.243 |
| 2012/0320984 | A1* | 12/2012 | Zhou | H04N 19/463 375/E7.125 |
| 2012/0327999 | A1* | 12/2012 | Francois | H04N 19/13 375/240.02 |
| 2013/0034157 | A1* | 2/2013 | Helle | H04N 19/463 375/E7.243 |
| 2013/0266064 | A1* | 10/2013 | Zhang | H04N 19/61 375/240.12 |
| 2013/0272381 | A1* | 10/2013 | Guo | H04N 19/119 375/240.12 |
| 2013/0287109 | A1* | 10/2013 | Wang | H04N 19/61 375/240.16 |
| 2016/0021379 | A1* | 1/2016 | Minezawa | H04N 19/176 375/240.13 |

OTHER PUBLICATIONS

Lee H.S., K. Y. Kim, T.R. Kim, G.H. Park, "Fast encoding algorithm based on depth of coding-unit for high efficiency video coding", Optical Engineering, 51 (6), 067402, Jun. 2012. (Year: 2012).*

Jafari M. and S. Kasaei, Fast intra- and Inter-Prediction Mode Decision in H.264 Advanced Video Coding, IJCSNS International Journal of Computer Science and Network Security, vol. 8 No. 5, May 2008. (Year: 2008).*

Zhao L., L. Zhang, S. Ma, D. Zhao, "Fast Mode Decision Algorithm for Intra Prediction in HEVC", Visuall Communications and Image Processing (VCIP), 2011 IEEE, Nov. 6-9, 2011, doi: 10.1109/VCIP.2011.6115979. (Year: 2011).*

Luo, B. and L. Zhang, "Fast Intra-Prediction Mode Selection Method for H.264 Video Coding", 2010 International Conference on Intelligent System Design and Engineering Application, doi 10.1109/ISDEA. 2010.307, 2010 IEEE (Year: 2010).*

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-260, Apr. 27-May 7, 2012, Geneva, Switzerland.

Benjamn Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, "High Efficiency Video Coding (HEVC) Text Specification Draft 10 (for FDIS & Last Call)", JCTVC-L1003_v34, Joint Collaborative Team on Video Coding (JCT-VC) of ITU-T SG16 WP3 and ISO/IEC JTC1/SC29/WG11, pp. 1-298, Jan. 14-23, 2013, Geneva, Switzerland.

"TMS320DM6467 Digital Media System-on-Chip", SPRS403G, Texas Instruments Incorporated, Dec. 2007, revised Oct. 2010, pp. 1-355.

Liao, K-Y, J-F Yang, and M-T Sun, "Rate Distortion Cost Estimation for H.264/AVC", IEEE Transactions on Circuits and Systems fo Video Technology, vol. 20, No. 1, Jan. 2010. (Year: 2010).

Zhao L., L. Zhang, S. Ma, D. Zhao, "Fast Mode Decision Algorithm for Intra Prediction in HEVC", Visuall Communications and Image Processing (VCIP), 2011 IEEE, Nov. 6-9, 2011, doi:10.1109NCIP.2011.6115979. (Year: 2011).

* cited by examiner

| A111 | A112 | A121 | A122 | A211 | A212 | A221 | A222 | B111 | B112 | B121 | B122 | B211 | B212 | B221 | B222 |
|---|---|---|---|---|---|---|---|---|---|---|---|---|---|---|---|
| A113 | A114 | A123 | A124 | A213 | A214 | A223 | A224 | B113 | B114 | B123 | B124 | B213 | B214 | B223 | B224 |
| A131 | A132 | A141 | A142 | A231 | A232 | A241 | A242 | B131 | B132 | B141 | B142 | B231 | B232 | B241 | B242 |
| A133 | A134 | A143 | A144 | A233 | A234 | A243 | A244 | B133 | B134 | B143 | B144 | B233 | B234 | B243 | B244 |
| A311 | A312 | A321 | A322 | A411 | A412 | A421 | A422 | B311 | B312 | B321 | B322 | B411 | B412 | B421 | B422 |
| A313 | A314 | A323 | A324 | A413 | A414 | A423 | A424 | B313 | B314 | B323 | B324 | B413 | B414 | B423 | B424 |
| A331 | A332 | A341 | A342 | A431 | A432 | A441 | A442 | B331 | B332 | B341 | B342 | B431 | B432 | B441 | B442 |
| A333 | A334 | A343 | A344 | A433 | A434 | A443 | A444 | B333 | B334 | B343 | B344 | B433 | B434 | B443 | B444 |
| C111 | C112 | C121 | C122 | C211 | C212 | C221 | C222 | D111 | D112 | D121 | D122 | D211 | D212 | D221 | D222 |
| C113 | C114 | C123 | C124 | C213 | C214 | C223 | C224 | D113 | D114 | D123 | D124 | D213 | D214 | D223 | D224 |
| C131 | C132 | C141 | C142 | C231 | C232 | C241 | C242 | D131 | D132 | D141 | D142 | D231 | D232 | D241 | D242 |
| C133 | C134 | C143 | C144 | C233 | C234 | C243 | C244 | D133 | D134 | D143 | D144 | D233 | D234 | D243 | D244 |
| C311 | C312 | C321 | C322 | C411 | C412 | C421 | C422 | D311 | D312 | D321 | D322 | D411 | D412 | D421 | D422 |
| C313 | C314 | C323 | C324 | C413 | C414 | C423 | C424 | D313 | D314 | D323 | D324 | D413 | D414 | D423 | D424 |
| C331 | C332 | C341 | C342 | C431 | C432 | C441 | C442 | D331 | D332 | D341 | D342 | D431 | D432 | D441 | D442 |
| C333 | C334 | C343 | C344 | C433 | C434 | C443 | C444 | D333 | D334 | D343 | D344 | D433 | D434 | D443 | D444 |

FIG. 2D

FAST INTRA-PREDICTION MODE SELECTION IN VIDEO CODING

CROSS-REFERENCE TO RELATED APPLICATIONS

This application is a continuation of U.S. patent application Ser. No. 17/088,346, filed on Nov. 3, 2020, which is a continuation of U.S. patent application Ser. No. 13/958,593, filed on Aug. 4, 2013 (now U.S. Pat. No. 10,863,184), which claims benefit of U.S. Provisional Patent Application Ser. No. 61/683,296 filed Aug. 15, 2012, all of which are incorporated herein by reference in their entirety.

BACKGROUND OF THE INVENTION

Field of the Invention

Embodiments of the present invention generally relate to fast intra-prediction mode selection in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and entropy coding of the transform coefficients.

HEVC is expected to provide around 50% improvement in coding efficiency over the current standard, H.264/AVC, as well as larger resolutions and higher frame rates. To address these requirements, HEVC utilizes larger block sizes than the current video coding standard, H.264/AVC. More specifically, in HEVC, a largest coding unit (LCU) is the base unit used for block-based coding. An LCU plays a similar role in coding as the 16×16 macroblock of H.264/AVC, but it may be larger, e.g., 32×32 or 64×64. In HEVC, a picture is divided into non-overlapping LCUs. To maximize coding efficiency, each LCU may be partitioned into coding units (CU) of different sizes using recursive quadtree partitioning. The maximum hierarchical depth of the quadtree is determined by the size of the smallest CU (SCU) permitted. The quadtree partitioning of an LCU into CUs is determined by a video encoder during prediction based on, e.g., minimization of rate/distortion costs.

HEVC provides a new intra-prediction scheme designed to maximize encoding efficiency. In general, this new scheme improves encoding performance by providing more prediction modes than those provided in H.264/AVC. For example, in H.264/AVC, there are 9, 9 and 4 luma intra-prediction modes for 4×4, 8×8 and 16×16 blocks, respectively. In contrast, in HEVC as currently defined, there are 35 luma intra-prediction modes for 4×4, 8×8, 16×16, 32×32 and 64×64 blocks. The 35 intra-prediction modes include 33 directional (angular) modes, a planar (surface fitting) mode, and a DC (flat) mode. Typically, an HEVC encoder performs a bottom up exhaustive search that considers all allowable CU sizes and all intra-prediction modes for each CU size to select the best CU hierarchy for an LCU and the best intra-prediction mode for each CU in the LCU, e.g., the CU hierarchy and intra-prediction modes that produce the minimal rate-distortion (coding) cost. This exhaustive approach adds significant computational complexity to the prediction process in the encoder.

SUMMARY

Embodiments of the present invention relate to methods, apparatus, and computer readable media for fast intra-prediction mode selection in video coding. In one aspect, A method for determining intra-prediction modes for prediction units (PUs) of a largest coding unit (LCU) is provided that includes determining an inter-prediction mode for each child PU of a PU, and selecting an intra-prediction mode for the PU based on the intra-prediction modes determined for the child PUs.

In one aspect, an apparatus configured to determine intra-prediction modes for prediction units (PUs) of a largest coding unit (LCU) is provided that includes means for determining an inter-prediction mode for each child PU of a PU, and means for selecting an intra-prediction mode for the PU based on the intra-prediction modes determined for the child PUs.

In one aspect, a method for determining intra-prediction modes for prediction units (PUs) of a largest coding unit (LCU) is provided that includes determining an inter-prediction mode for each N×N PU of all N×N PUs of the LCU, wherein an inter-prediction mode for each N×N PU is selected from all intra-prediction modes defined for an N×N PU and N×N is a smallest PU size for the LCU, and determining an intra-prediction mode for each 2N×2N PU of all 2N×2N PUs of the LCU, wherein an intra-prediction mode for each 2N×2N PU is selected from the intra-prediction modes determined for the N×N PUs contained in the 2N×2N PU.

BRIEF DESCRIPTION OF THE DRAWINGS

Particular embodiments will now be described, by way of example only, and with reference to the accompanying drawings:

FIGS. 2A-2D are an example;

DETAILED DESCRIPTION OF EMBODIMENTS OF THE INVENTION

Figure 1:
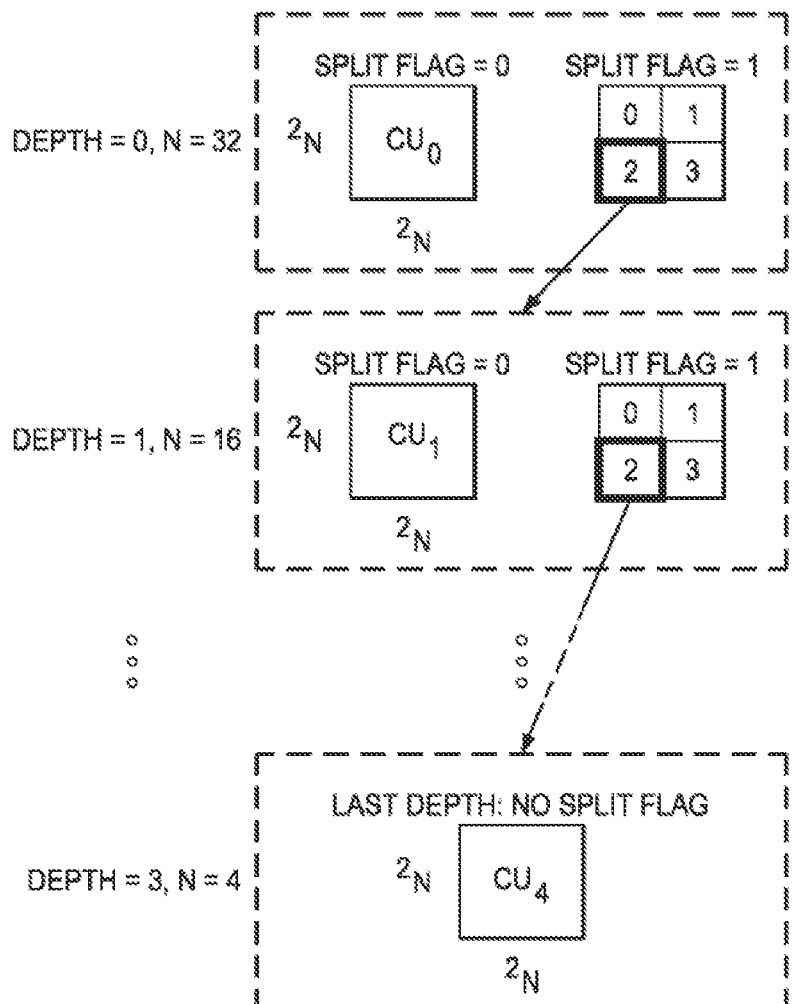
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, California, Feb. 1-10, 2012, ("HEVC Draft 6"), B. Bross, et al., "High Efficiency Video Coding (HEVC) Text Specification Draft 7," JCTVC-I1003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10").

As previously mentioned, in HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU) using recursive quadtree partitioning. A CU is a block of pixels within an LCU and the CUs within an LCU may be of different sizes. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

FIG. 1 shows an example of CU partitioning in which the LCU size is 64×64 and the maximum hierarchical depth is 3. The recursive structure, i.e., the partitioning, is represented by a series of split flags. For $CU_d$, which has depth d and size 2N×2N, the coding of the CU is performed in the current depth when split flag is set to zero. When the split flag is set to 1, $CU_d$ is split into 4 independent $CU_{d+1}$ which have depth (d+1) and size N×N. In this case, $CU_{d+1}$ is referred to as a sub-CU of $CU_d$ Unless the depth of sub-CU (d+1) is equal to the maximum allowed depth, each $CU_{d+1}$ is processed in a recursive manner. If the depth of sub-CU (d+1) is equal to the maximum allowed depth, further splitting is not allowed. For coding, a CU can be further split into PUs and TUs. The sizes of an LCU and SCU are specified in the Sequence Parameter Set (SPS). The embedded information in the SPS is LCU size (s) and the maximum hierarchical depth (h) in a LCU. For example, if s=64 and h=4, then 4 CU sizes are possible: 64×64 (LCU), 32×32, 16×16 and 8×8 (SCU). If s=16 and h=2, then 16×16 (LCU) and 8×8 (SCU) are possible.

As previously mentioned, in some encoders, determination of the best CU structure and the best prediction mode (intra or inter) for a CU is performed bottom up, i.e., starting with the smallest possible CU partitioning and working up the hierarchy levels. More specifically, for each CU of each CU size, starting with the smallest CU size, the encoder determines an intra-prediction coding cost for the CU, the best PU partition type for the CU, and an intra-prediction mode for each PU of the best partition type. To determine the best PU partition type and the intra-prediction modes for the PUs of the best PU partition type, the encoder partitions the CU into PUs according to HEVC-specified PU partition types for intra-prediction of a CU of the CU size. Tests are performed on each PU of a PU partition type according to intra-prediction modes specified for the PU size to choose the best intra-prediction mode for each PU based on coding costs of these modes. HEVC defines 35 intra-prediction modes that apply to all PU sizes. For intra-prediction, a CU has only one PU, i.e., CU=PU, except for the smallest CU size (SCU). CUs of the smallest CU size may be split into four PUs. In this latter case, each PU may have a different intra-prediction mode.

Figures 2A, 2B, 2C:
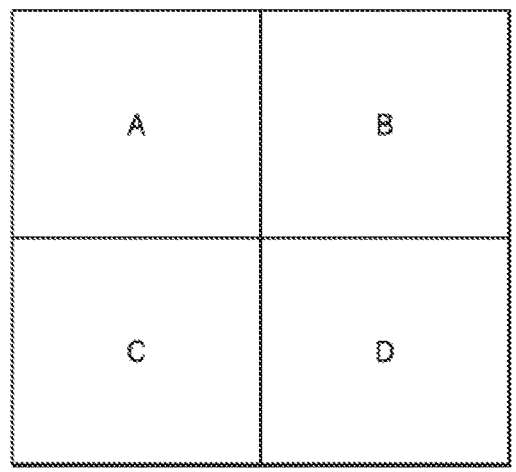

This exhaustive approach for determining intra-prediction modes adds significant computational complexity to the prediction process in an encoder. For example, assume a 64×64 LCU and a hierarchy depth of 3. Thus, the smallest CU size is 8×8. FIGS. 2A-2C illustrate, respectively, the partitioning of a 64×64 LCU into 32×32 CUs, the 32×32 CUs into 16×16 CUs, and the 16×16 CUs into 8×8 CUs. FIG. 2D illustrates the partitioning of the 8×8 CUs into 4×4 PUs. To determine the best intra-prediction mode for all allowed partitionings of a 64×64 LCU, all 35 intra-prediction modes are tested for each of the 256 4×4 blocks (PUs) of FIG. 2D, each of the 64 8×8 blocks (CU/PU) of FIG. 2C, each of the 16 16×16 blocks (CU/PU) of FIG. 2B, each of the four 32×32 blocks (CU/PU) of FIG. 2A, and for the 64×64 block (PU/LCU).

Embodiments of the invention provide for bottom-up determination of intra-prediction modes for the PUs of an LCU at each hierarchy level with less computational complexity and with encoding performance comparable to the above described prior art exhaustive intra-prediction mode determination. Rather than considering all 35 intra-prediction modes for all PUs at each hierarchy level, the 35 intra-prediction modes are only considered for the PUs at the lowest level in the hierarchy, i.e., the smallest PUs. For each PU in the upper levels in the block hierarchy, i.e., each parent block, rather than testing all 35 intra-prediction modes, the best intra-prediction mode for a parent block is selected from the intra-prediction modes selected for the four sub-blocks (child blocks) of that block. For example, the intra-prediction mode for block (PU) A of FIG. 2A would be selected from the intra-prediction modes determined for sub-blocks A1, A2, A3, and A4 (FIG. 2B). Similarly, the intra-prediction mode for block (PU) B1 of FIG. 2B would be selected from the intra-prediction modes determined for sub-blocks B11, B12, B13, and B14 (FIG. 2C). The intra-prediction mode for block (PU) C11 of FIG. 2C would be selected from the intra-prediction modes determined for sub-blocks C111, C112, C113, and C114 (FIG. 2D). The intra-prediction mode for each of the 4×4 blocks (PUs) of FIG. 2D would be determined by testing all 35 intra-prediction modes. As is explained in more detail herein, in some embodiments, once an intra-prediction mode for a parent block is selected from the intra-prediction modes of the four child blocks, further refinement may be performed based on the selected intra-prediction mode to determine the best intra-prediction mode for the parent block.

For simplicity of explanation, embodiments are described herein assuming a 64×64 LCU and a hierarchy depth of 3. Thus, the smallest CU size is 8×8. One of ordinary skill in the art will understand other embodiments with differing LCU sizes and/or hierarchy depths.

Figure 3:
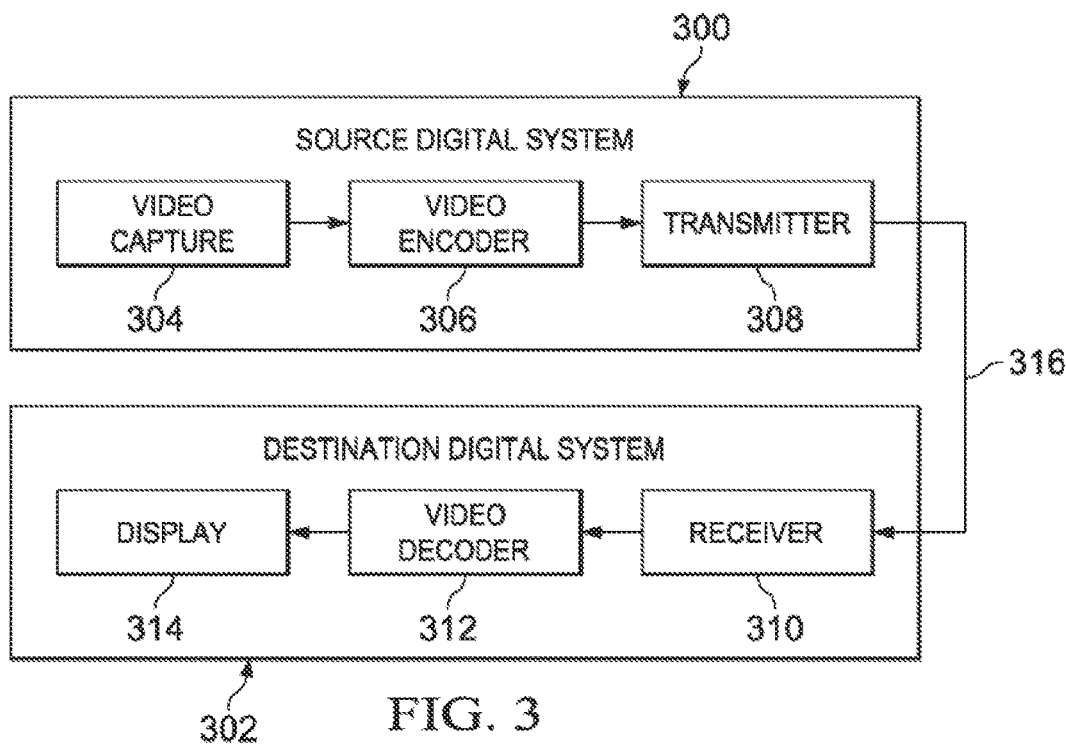
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. As part of the encoding process, the video encoder component 306 may perform a method for intra-prediction as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
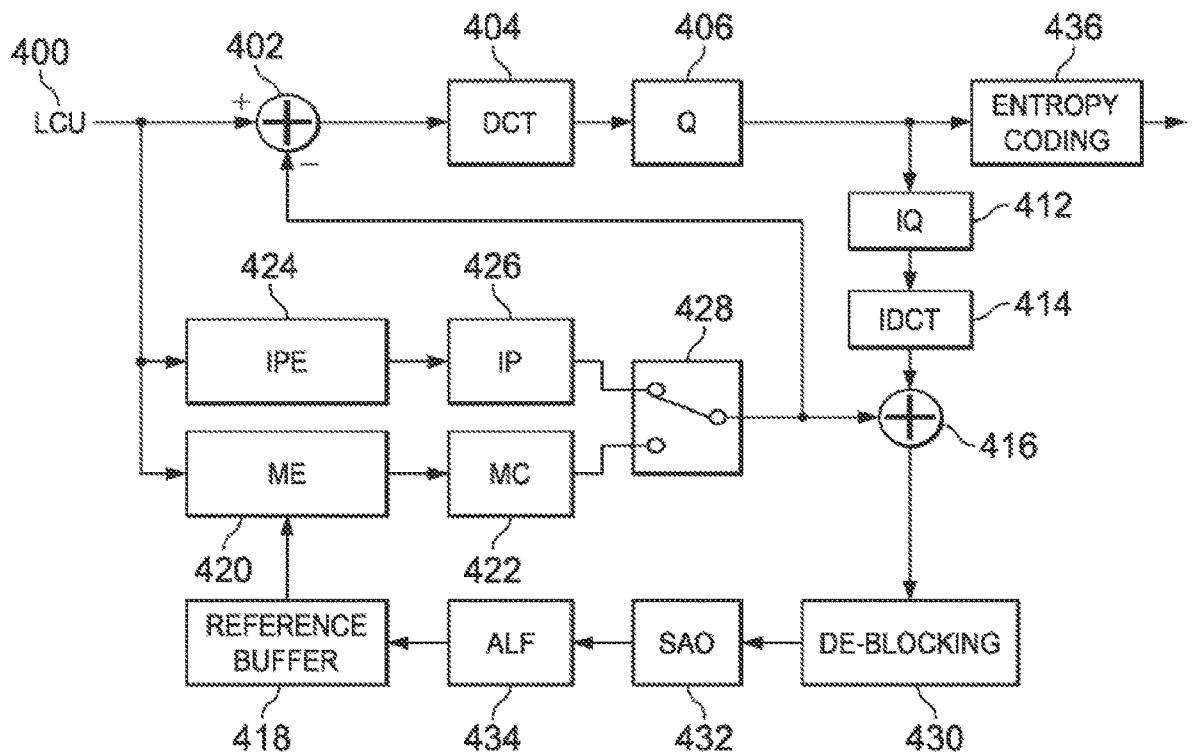
FIG. 4 is a block diagram of a video encoder.

FIG. 4 is a block diagram of the LCU processing portion of an example video encoder. An input digital video sequence is provided to a coding control component (not shown). The coding control component sequences the various operations of the video encoder, i.e., the coding control component runs the main control loop for video encoding. For example, the coding control component performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 400 of the input video sequence from the coding control component and encodes the LCUs 400 under the control of the coding control component to generate the compressed video stream. The LCUs 400 from the coding control component 440 are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426. The intra-prediction estimation component 424 may determine intra-prediction modes for the PUs as per the method of FIG. 5.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component 440. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component 440 and the transform sizes and provides the quantized transform coefficients to the entropy coding component 436 for coding in the bit stream.

The entropy coding component 436 entropy encodes the relevant data, i.e., syntax elements, output by the various encoding components and the coding control component 440 to generate the compressed video bit stream. Among the syntax elements that are encoded are picture parameter sets, flags indicating the CU/PU/TU partitioning of an LCU, the prediction modes for the CUs, and the quantized transform coefficients for the CUs.

The LCU processing component 442 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
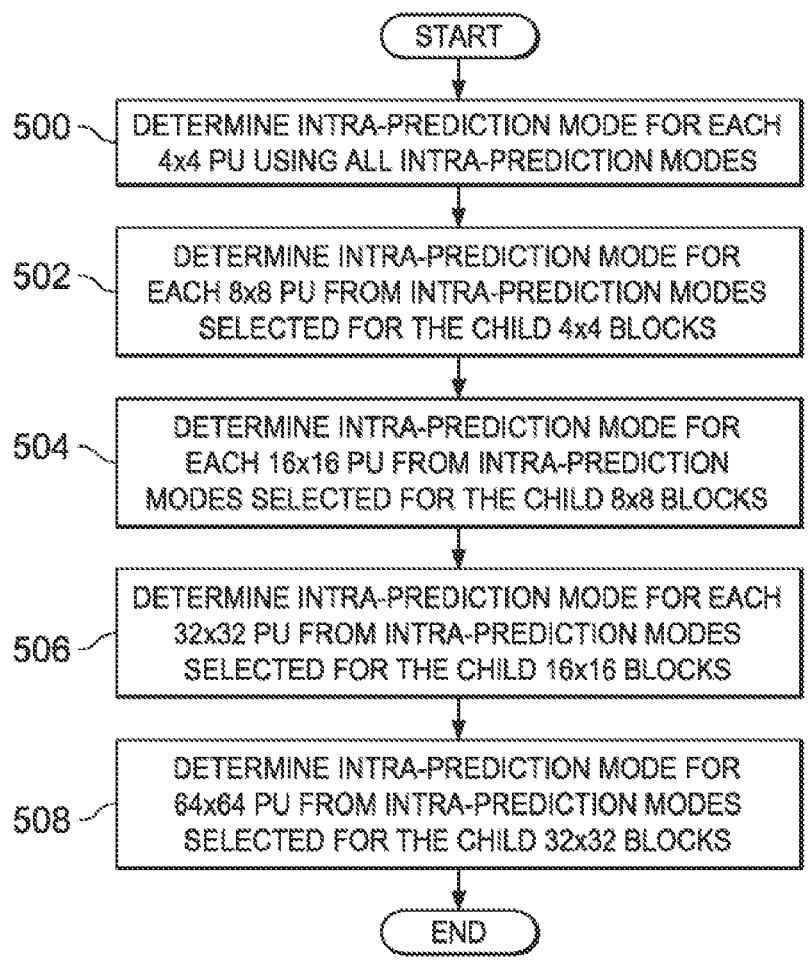
FIG. 5 is a flow diagram of a method for determining intra-prediction modes.

FIG. 5 is a flow diagram of a method for bottom-up determination of intra-prediction modes for all possible PUs of an LCU. The method is explained in reference to the example partitioning of FIGS. 2A-2D. As was previously mentioned, for intra-prediction, CU=PU except for the SCU. A CU that is an SCU may be partitioned into four PUs. Initially, a best intra-prediction mode is determined 500 for each of the 4×4 PUs of the LCU. FIG. 2D illustrates the partitioning of the LCU into 4×4 PUs. To determine the best intra-prediction mode for each of the 4×4 PUs, all 35 intra-prediction modes are tested and the mode with the best coding cost is selected for the PU.

Next, an intra-prediction mode is determined 502 for each of the 8×8 PUs of the LCU. FIG. 2C illustrates the partitioning of the LCU into 8×8 PUs. Note that each of the 8×8 PUs contains four of the 4×4 PUs (FIG. 2D) for which intra-prediction modes have been determined. For example, the 8×8 PU C13 contains the 4×4 PUs C131, C132, C133, and C134. Rather than testing all 35 intra-prediction modes to determine an intra-prediction mode for an 8×8 PU, only the intra-prediction modes selected for the four 4×4 child PUs are tested and the one with the best coding cost is selected as the intra-prediction mode for the parent 8×8 PU. Thus, for the 8×8 PU C13, the intra-prediction modes selected for C131, C132, C133, and C134 are tested to select one of the modes as the intra-prediction mode for PU C13. Note that the 4×4 child PUs may each have a distinct intra-prediction mode or 2 or more of the child PUs may have the same intra-prediction mode. Thus, the testing for an 8×8 PU may involve testing 2, 3, or 4 intra-predictions modes. If the child PUs all have the same intra-prediction mode, then that mode is automatically selected for the parent 8×8 PU.

Next, an intra-prediction mode is determined 504 for each of the 16×16 PUs of the LCU. FIG. 2B illustrates the partitioning of the LCU into 16×16 PUs. Note that each of the 16×16 PUs contains four of the 8×8 PUs (FIG. 2C) for which intra-prediction modes have been determined. For example, the 16×16 PU B3 contains the 8×8 PUs B31, B32, B33, and B34. Rather than testing all 35 intra-prediction modes to determine an intra-prediction mode for a 16×16 PU, only the intra-prediction modes selected for the four 8×8 child PUs are tested and the one with the best coding cost is selected as the intra-prediction mode for the parent 16×16 PU. Thus, for the 16×16 PU B3, the intra-prediction modes selected for B31, B32, B33, and B34 are tested to select one of the modes as the intra-prediction mode for PU B3. Note that the 8×8 child PUs may each have a distinct intra-prediction mode or 2 or more of the child PUs may have the same intra-prediction mode. Thus, the testing for a 16×16 PU may involve testing 2, 3, or 4 intra-predictions modes. If the child PUs all have the same intra-prediction mode, then that mode is automatically selected for the parent 16×16 PU.

Next, an intra-prediction mode is determined 506 for each of the 32×32 PUs of the LCU. FIG. 2A illustrates the partitioning of the LCU into 32×32 PUs. Note that each of the 32×32 PUs contains four of the 16×16 PUs (FIG. 2B) for which intra-prediction modes have been determined. For example, the 32×32 PU D contains the 16×16 PUs D1, D2, D3, and D4. Rather than testing all 35 intra-prediction modes to determine an intra-prediction mode for a 32×32 PU, only the intra-prediction modes selected for the four 16×16 child PUs are tested and the one with best coding cost is selected as the intra-prediction mode for the parent 32×32 PU. Thus, for the 32×32 PU D, the intra-prediction modes selected for D1, D2, D3, and D4 are tested to select one of the modes as the intra-prediction mode for PU D. Note that the 16×16 child PUs may each have a distinct intra-prediction mode or 2 or more of the child PUs may have the same intra-prediction mode. Thus, the testing for a 32×32 PU may involve testing 2, 3, or 4 intra-predictions modes. If the child PUs all have the same intra-prediction mode, then that mode is automatically selected for the parent 32×32 PU.

Finally, an intra-prediction mode is determined 508 for the 64×64 PU of the LCU. Note that the 64×64 PUs contains the four 32×32 PUs A, B, C, and D (FIG. 2A) for which intra-prediction modes have been determined. Rather than testing all 35 intra-prediction modes to determine an intra-prediction mode for the 64×64 PU, only the intra-prediction modes selected for the four 32×32 child PUs are tested and the one with best coding cost is selected as the intra-prediction mode for the parent 64×64 PU. Thus, for the 64×64 PU, the intra-prediction modes selected for A, B, C, and D are tested to select one of the modes as the intra-prediction mode for the 64×64 PU. Note that the 32×32 child PUs may each have a distinct intra-prediction mode or 2 or more of the child PUs may have the same intra-prediction mode. Thus, the testing for a 64×64 PU may involve testing 2, 3, or 4 intra-predictions modes. If the child PUs all have the same intra-prediction mode, then that mode is automatically selected for the parent 64×64 PU.

In some embodiments of the method of FIG. 5, once an intra-prediction mode is selected for a parent PU from the mode or modes determined for the four child PUs, a refinement process may be applied in which two or more modes surrounding the selected intra-prediction mode are also tested and the intra-prediction mode with the best coding cost from among the intra-prediction mode selected from the intra-prediction modes of the child PUs and the surrounding intra-prediction modes is selected as the intra-prediction mode for the parent PU. The number of surrounding modes to be considered is implementation specific and may depend on available computational capacity. In some such embodiments, two surrounding modes are tested.

As previously mentioned, HEVC defines 35 intra-prediction modes. These modes are numbered consecutively as 0-34. Table 1 shows the mode identifier for each of the 33 angular intra-prediction modes and the associated intra-prediction angle. Mode 1 designates the DC mode and mode 0 designates the planar mode. Modes surrounding a mode are those modes numerically higher or lower than the mode in sequential numerical order. For example, for intra-prediction mode 6, if two surrounding modes are to be tested, the two surrounding modes would be 5 and 7. If four surrounding modes are to be tested, the surrounding modes would be 4, 5, 7, and 8.

TABLE 1

| Mode | 2 | 3 | 4 | 5 | 6 | 7 | 8 | 9 | 10 | 11 | 12 |
|---|---|---|---|---|---|---|---|---|---|---|---|
| intraPredAngle | 32 | 26 | 21 | 17 | 13 | 9 | 5 | 2 | 0 | −2 | −5 |
| Mode | 13 | 14 | 15 | 16 | 17 | 18 | 19 | 20 | 21 | 22 | 23 |
| intraPredAngle | −9 | −13 | −17 | −21 | −26 | −32 | −26 | −21 | −17 | −13 | −9 |
| Mode | 24 | 25 | 26 | 27 | 28 | 29 | 30 | 31 | 32 | 33 | 34 |
| intraPredAngle | −5 | −2 | 0 | 2 | 5 | 9 | 13 | 17 | 21 | 26 | 32 |

Table 2 shows a comparison of the number of intra-prediction modes examined for each PU size in the prior art bottom-up exhaustive intra-prediction technique and the simplified bottom intra-prediction described herein. In this table, a is the number of additional modes considered in the refinement process, which may range from 0 to 31.

TABLE 2

| | Number of modes examined in prior art intra-prediction | Maximum number of modes examined in simplified intra-prediction |
|---|---|---|
| 4 × 4 | 35 | 35 |
| 8 × 8 | 35 | 4 + α |
| 16 × 16 | 35 | 4 + α |
| 32 × 32 | 35 | 4 + α |
| 64 × 64 | 35 | 4 + α |

Figure 6:
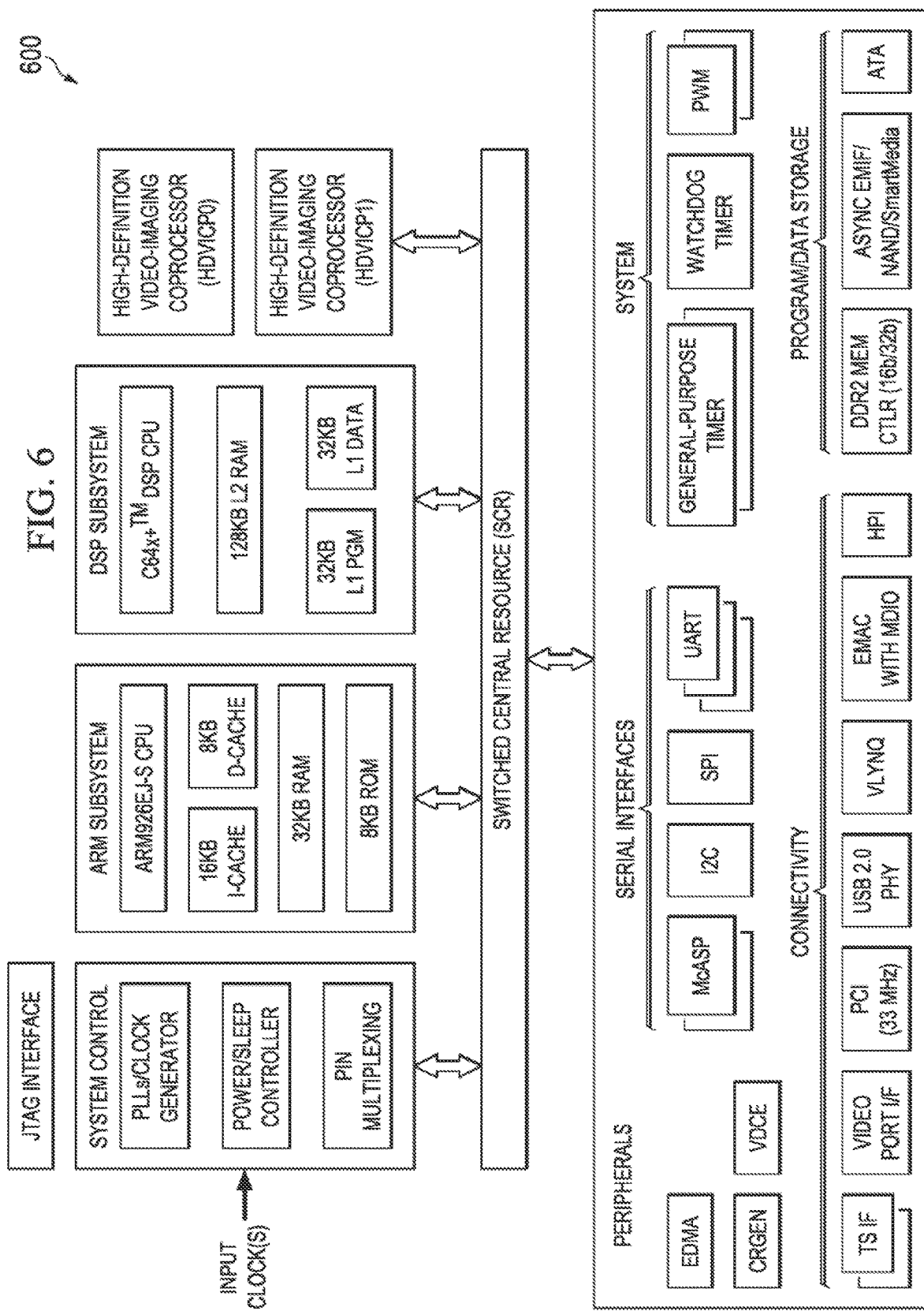
FIG. 6 is a block diagram of an illustrative digital system.

FIG. 6 is a block diagram of an example digital system suitable for use as an embedded system that may be configured to encode a video sequence a compressed video bit stream using a method for intra-prediction mode determination as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 600 is a programmable platform designed to meet the processing needs of applications such as video encode/decode/transcode/transrate, video surveillance, video conferencing, set-top box, medical imaging, media server, gaming, digital signage, etc. The SoC 600 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 600 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 600, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 600 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 6, the SoC 600 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein using the intra-prediction modes currently defined for HEVC. One of ordinary skill in the art will understand that any suitable number of intra-prediction modes may be used and that the number of intra-prediction modes may be varied based on PU size.

In another example, embodiments have been described herein in which each parent block has four child blocks. One of ordinary skill in the art will understand embodiments in which the number of child blocks may differ.

In another example, embodiments have been described herein in which a refinement process is applied after an intra-prediction mode is selected for a parent PU from the mode or modes determined for the four child PUs to select a best mode from among the selected mode and two more surrounding modes. One of ordinary skill in the art will understand embodiments in which rather than applying the refinement process with the selected mode, the refinement process is applied when each of the intra-prediction modes of the child PUs is tested for the parent PU. That is, for each intra-prediction mode of a child PU, two or more surrounding modes may also tested. The best intra-prediction mode from among those tested is then selected for the parent PU.

Embodiments of the methods and encoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method of encoding comprising:
    receiving, by a processor, a coding unit;
    partitioning, by the processor, the coding unit into a set of hierarchical levels of prediction units including a first prediction unit of a first level of the set of hierarchical levels and a set of prediction units of a second level of the set of hierarchical levels, wherein the first prediction unit is larger than the set of prediction units; and
    determining, by the processor, an intra-prediction mode for the first prediction unit based on a first sub-set of intra-prediction modes associated with the set of prediction units of the second level of the set of hierarchical levels,
    the first sub-set of intra-prediction modes being a number of intra-prediction modes that is less than the number of intra-prediction modes in a corresponding set of intra-prediction modes.

2. The method of encoding of claim 1, wherein:
the set of prediction units of the second level includes a set of four prediction units.

3. The method of encoding of claim 1, wherein:
the determining the intra-prediction mode for the first prediction unit is based on a second sub-set of intra-prediction modes associated with a third level of the set of hierarchical levels.

4. The method of encoding of claim 3, wherein:
the second sub-set of intra-prediction modes is determined based on the first sub-set of intra-prediction modes associated with the second level of the set of hierarchical levels.

5. The method of encoding of claim 1, wherein:
the determining the intra-prediction mode for the first prediction unit is based on a cost comparison of each of the first sub-set of intra-prediction modes to select the intra-prediction mode for the first prediction unit with the lowest cost.

6. The method of encoding of claim 1, further comprising:
applying, by the processor, the set of intra-prediction modes to each of the set of prediction units of the second level to determine a cost associated with each of the set of intra-prediction modes.

7. The method of encoding of claim 6, wherein:
the set of intra-prediction modes includes 35 different intra-prediction modes.

8. An encoder comprising:
one or more processors; and
a non-transitory computer readable storage medium storing a program for execution by the one or more processors, the program including instructions to cause the one or more processors to:
    receive a coding unit;
    partition the coding unit into a set of hierarchical levels of prediction unit including a first prediction unit of a first level of the set of hierarchical levels and a set of prediction units of a second level of the set of hierarchical levels, wherein the first prediction unit is larger than the set of prediction units; and
    determine an intra-prediction mode for the first prediction unit based on a first sub-set of intra-prediction modes associated with the set of prediction units of the second level of the set of hierarchical levels,
    the first sub-set of intra-prediction modes being a number of intra-prediction modes that is less than the number of intra-prediction modes in a corresponding set of intra-prediction modes.

9. The encoder of claim 8, wherein:
the set of prediction units of the second level includes a set of four prediction units.

10. The encoder of claim 8, wherein:
the intra-prediction mode for the first prediction unit is based on a second sub-set of intra-prediction modes associated with a third level of the set of hierarchical levels.

11. The encoder of claim 10, wherein:
the second sub-set of intra-prediction modes is determined based on the first sub-set of intra-prediction modes associated with the second level of the set of hierarchical levels.

12. The encoder of claim 8, wherein:
the intra-prediction mode for the first prediction unit is based on a cost comparison of each of the first sub-set of intra-prediction modes to select the intra-prediction mode for the first prediction unit with a lowest cost.

13. The encoder of claim 8, wherein the instructions cause the one of more processors to:

apply the set of intra-prediction modes to each of the set of prediction units of the second level to determine a cost associated with each of the set of intra-prediction modes.

14. The encoder of claim 13, wherein:
the set of intra-prediction modes includes 35 different intra-prediction modes.

15. A system comprising:
a video capture component configured to receive a picture; and
an encoder configured to:
   receive a coding unit;
   partition the coding unit into a set of hierarchical levels of prediction units including a first prediction unit of a first level of the set of hierarchical levels and a set of prediction units of a second level of the set of hierarchical levels, wherein the first prediction unit is larger than the set of prediction units; and
   determine an intra-prediction mode for the first prediction unit based on a first sub-set of intra-prediction modes associated with the set of prediction units of the second level of the set of hierarchical levels,
   the first sub-set of intra-prediction modes being a number of intra-prediction modes that is less than the number of intra-prediction modes in a corresponding set of intra-prediction modes.

16. The system of claim 15, wherein:
the set of prediction units of the second level includes a set of four prediction units.

17. The system of claim 15, wherein:
the intra-prediction mode for the first prediction unit is based on a second sub-set of intra-prediction modes associated with a third level of the set of hierarchical levels.

18. The system of claim 17, wherein:
the second sub-set of intra-prediction modes is determined based on the first sub-set of intra-prediction modes associated with the second level of the set of hierarchical levels.

19. The system of claim 15, wherein:
the intra-prediction mode of the first prediction unit is based on a cost comparison of each of the first sub-set of intra-prediction modes to select the intra-prediction mode for the first prediction unit with the lowest cost.

20. The system of claim 15, wherein the encoder is configured to:
apply the set of intra-prediction modes to each of the set of prediction units of the second level to determine a cost associated with each of the set of intra-prediction modes.

* * * * *